(12) United States Patent
Mahan et al.

(10) Patent No.: US 9,524,378 B2
(45) Date of Patent: Dec. 20, 2016

(54) APPARATUS AND METHOD OF IN-APPLICATION LICENSING

(75) Inventors: Michael P. Mahan, San Diego, CA (US); Kenneth S. Swinson, San Diego, CA (US); Giridhar D. Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 13/118,701

(22) Filed: May 31, 2011

(65) Prior Publication Data
US 2012/0311724 A1   Dec. 6, 2012

(51) Int. Cl.
*G06F 7/04* (2006.01)
*G06F 21/10* (2013.01)
*G06F 21/62* (2013.01)

(52) U.S. Cl.
CPC .............. *G06F 21/10* (2013.01); *G06F 21/629* (2013.01)

(58) Field of Classification Search
CPC .............. G06F 21/10; G06F 2221/2141; G06F 21/6209; G06F 2221/2117; G06F 2221/2153; G06F 17/30575; G06F 2221/2137; G06F 21/6218; H04L 2463/101; H04L 2463/102; H04L 2209/603; H04L 63/0428; H04L 63/08; G11B 20/00086; G11B 20/00
See application file for complete search history.

(56) References Cited

U.S. PATENT DOCUMENTS

| 6,754,823 | B1 | 6/2004 | Kurzweil et al. |
| 8,185,476 | B2* | 5/2012 | Zhu et al. ......................... 705/59 |
| 2005/0050315 | A1 | 3/2005 | Burkhardt et al. |
| 2005/0071276 | A1 | 3/2005 | Bruchlos et al. |
| 2005/0091216 | A1* | 4/2005 | Kranz et al. .................... 707/10 |
| 2006/0064761 | A1 | 3/2006 | Multerer et al. |

(Continued)

FOREIGN PATENT DOCUMENTS

| CN | 1604103 A | 4/2005 |
| CN | 101310284 A | 11/2008 |

(Continued)

OTHER PUBLICATIONS

International Search Report and Written Opinion—PCT/US2012/039673—ISA/EPO—Sep. 7, 2012.

*Primary Examiner* — Ali Abyaneh
(74) *Attorney, Agent, or Firm* — Shirin Tefagh

(57) ABSTRACT

Apparatus and methods for licensing include executing a base application on a device, initiating a transaction with an application store to obtain access to a subordinate licensable item that is usable by the base application, receiving a transaction receipt corresponding to the transaction for the subordinate licensable item, and obtaining, from a license server, a subordinate license that corresponds to the subordinate licensable item. Additionally, the apparatus and methods may include storing a base license for a base application on a device, acquiring a subordinate license for a subordinate licensable item usable by the base application, receiving a request to execute the base application, enforcing, by a license agent service on the device, the base license with respect to executing the base application, and enforcing, by the base application, the subordinate license during execution of the base application.

53 Claims, 12 Drawing Sheets

(56) References Cited

U.S. PATENT DOCUMENTS

| | | |
|---|---|---|
| 2006/0122940 A1* | 6/2006 | Coley et al. .................... 705/59 |
| 2006/0179002 A1* | 8/2006 | Brooks et al. ................. 705/59 |
| 2007/0043679 A1 | 2/2007 | Le et al. |
| 2007/0198429 A1* | 8/2007 | Coley et al. .................... 705/59 |
| 2008/0320551 A1 | 12/2008 | Grigorovitch et al. |
| 2010/0235254 A1* | 9/2010 | Mirrashidi et al. ............. 705/26 |
| 2010/0235889 A1* | 9/2010 | Chu et al. ......................... 726/4 |
| 2011/0055881 A1 | 3/2011 | Yu et al. |
| 2012/0060031 A1* | 3/2012 | Huang et al. ................. 713/168 |
| 2012/0254047 A1* | 10/2012 | Dwivedi et al. ............. 705/310 |
| 2012/0311656 A1 | 12/2012 | Hohlfeld et al. |
| 2012/0331048 A1 | 12/2012 | Atashband et al. |

FOREIGN PATENT DOCUMENTS

| | | |
|---|---|---|
| CN | 101444119 A | 5/2009 |
| CN | 101632079 A | 1/2010 |
| EP | 1688855 A2 | 8/2006 |
| EP | 1942429 A2 | 7/2008 |
| JP | 2004054502 A | 2/2004 |
| JP | 2005004304 A | 1/2005 |
| JP | 2005141413 A | 6/2005 |
| JP | 2006216041 A | 8/2006 |
| JP | 2007220062 A | 8/2007 |
| JP | 2009529179 A | 8/2009 |
| JP | 2010218559 A | 9/2010 |
| KR | 20080063958 A | 7/2008 |
| WO | 2004077911 A2 | 9/2004 |

\* cited by examiner

APPARATUS AND METHOD OF IN-APPLICATION LICENSING

REFERENCE TO CO-PENDING APPLICATIONS FOR PATENT

The present Application for Patent is related to the following co-pending U.S. Patent Application "Apparatus and Method of Layered Licensing" by Hohlfeld, et al., application Ser. No. 13/118,738 filed May 31, 2011, assigned to the assignee hereof, and expressly incorporated by reference herein.

BACKGROUND

The present disclosure relates to a communication environment, and more particularly, to providing improved apparatus and methods of managing licensed items.

Although the described aspects relate generally to communication devices, an example use case with mobile devices illustrates problems with current licensing models. Mobile operators or mobile device carriers play a major part in the telecommunication industry today. Initially, such mobile operators concentrated their efforts on generating revenue by increasing their subscriber base. However, it will be appreciated that in several countries the scope for increasing the subscriber base has now become very limited, as the market has reached close to saturation point. As a result, the mobile operators have been branching into providing value added services to subscribers, in order to increase their revenue.

One means of generating increased revenue is through the sales of premium content and/or services to users, such as ringtones, wallpaper, games, etc. These items may be provided by the mobile operators themselves, or by business entities who may operate in collaboration with the mobile operators to provide such items. In some aspects, for example, these content and/or service items may be available for download to a user's communication device, such as a mobile device, upon payment of a fee.

Many benefits such as maximizing the potential earnings for sales may accrue upon recommending and distributing to users content and/or services that are of interest to the users. The user can have a better experience using the user's communication device in light of these content and/or services. Licensing of such content and/or services can provide an incentive for providers to create such offerings.

For example, in one aspect, developers and publishers in some instances distribute content and/or services in the form of applications that in turn can serve as a means for making additional sales. For example, a base application can include base licensed items, e.g. base content and/or services such as base features of the application, and can modified to further make available subordinate licensable items, e.g. additional content and/or services that provide additional capabilities to the base application. For instance, one or more of the subordinate licensable items may be initially provided with the base application, but may be locked or otherwise made inaccessible. Alternatively, or in addition, one or more of the subordinate licensable items may be subsequently added to the base application (e.g., additions, upgrades or expansions). Conventionally, the application bears the burden for providing a user experience for discovering the subordinate licensable items, for offering to purchase or otherwise transact for the subordinate licensable items, and for enforcing any restrictions on such subordinate licensable items. In some instances, the communication device or a network operator facilitates billing for the subordinate licensable item or for enforcing a license for the application.

However, improvements in acquisition and licensing enforcement of licensable items are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure provides a method for licensing on a device. The method includes executing a base application on a device, and initiating, by the base application, a transaction with an application store to obtain access to a subordinate licensable item that is usable by the base application. The method further includes receiving a transaction receipt corresponding to the transaction for the subordinate licensable item, and obtaining, from a license server, a subordinate license that corresponds to the subordinate licensable item.

In another aspect, the present disclosure provides at least one processor for licensing on a device. A first module executes a base application on a device. A second module initiates, by the base application, a transaction with an application store to obtain access to a subordinate licensable item that is usable by the base application. A third module receives a transaction receipt corresponding to the transaction for the subordinate licensable item. A fourth module obtains, from a license server, a subordinate license that corresponds to the subordinate licensable item.

In an additional aspect, the present disclosure provides a computer program product for licensing on a device. A non-transitory computer-readable storage medium stores instructions. At least one instruction causes a computer to execute a base application on a device. At least one instruction causes the computer to initiate, by the base application, a transaction with an application store to obtain access to a subordinate licensable item that is usable by the base application. At least one instruction causes the computer to receive a transaction receipt corresponding to the transaction for the subordinate licensable item. At least one instruction causes the computer to obtain, from a license server, a subordinate license that corresponds to the subordinate licensable item.

In a further aspect, the present disclosure provides an apparatus for licensing on a device. The apparatus comprises means for executing a base application on a device. The apparatus further comprises means for initiating, by the base application, a transaction with an application store to obtain access to a subordinate licensable item that is usable by the base application. Additionally, the apparatus comprises receiving a transaction receipt corresponding to the transaction for the subordinate licensable item. The apparatus comprises means for obtaining, from a license server, a subordinate license that corresponds to the subordinate licensable item.

In yet another aspect, the present disclosure provides an apparatus for licensing on a device. The apparatus includes a communication component and a base applications. The base application, which executes on a device, initiates, via the communication component, a transaction with an application store to obtain access to a subordinate licensable item that is usable by the base application. The base application further receives a transaction receipt corresponding to the transaction for the subordinate licensable item. A license agent service obtains, from a license server via the communication component, a subordinate license that corresponds to the subordinate licensable item.

In one aspect, the present disclosure provides a method for licensing on a device. The method includes storing a base license for a base application on a device, and acquiring, by the device, a subordinate license for a subordinate licensable item usable by the base application. The method further includes receiving a request to execute the base application, and enforcing, by a license agent service on the device, the base license with respect to executing the base application. Additionally, the method includes enforcing, by the base application, the subordinate license during execution of the base application.

In another aspect, the present disclosure provides at least one processor for licensing on a device. A first module stores a base license for a base application on a device. A second module acquires, by the device, a subordinate license for a subordinate licensable item usable by the base application. A third module receives a request to execute the base application. A fourth module enforces, by a license agent service on the device, the base license with respect to executing the base application. A fifth module enforces, by the base application, the subordinate license during execution of the base application.

In an additional aspect, the present disclosure provides a computer program product for licensing on a device. A non-transitory computer-readable storage medium stores instructions. At least one instruction causes a computer to store a base license for a base application on a device. At least one instruction causes the computer to acquire, by the device, a subordinate license for a subordinate licensable item usable by the base application. At least one instruction causes the computer to receive a request to execute the base application. At least one instruction causes the computer to enforce, by a license agent service on the device, the base license with respect to executing the base application. At least one instruction causes the computer to enforce, by the base application, the subordinate license during execution of the base application.

In a further aspect, the present disclosure provides an apparatus for licensing on a device. The apparatus includes means for storing a base license for a base application on a device. The apparatus further includes means for acquiring, by the device, a subordinate license for a subordinate licensable item usable by the base application. Additionally, the apparatus includes means for receiving a request to execute the base application. The apparatus further includes means for enforcing, by a license agent service on the device, the base license with respect to executing the base application. The apparatus further includes means for enforcing, by the base application, the subordinate license during execution of the base application.

In yet another aspect, the present disclosure provides an apparatus of licensing on a device. A memory stores a base license for a base application on a device. An in-application purchase service component acquires, by the device, a subordinate license for a subordinate licensable item usable by the base application. A license agent service component on the device receives a request to execute the base application and for enforcing the base license with respect to executing the base application. The base application enforces the subordinate license during execution.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
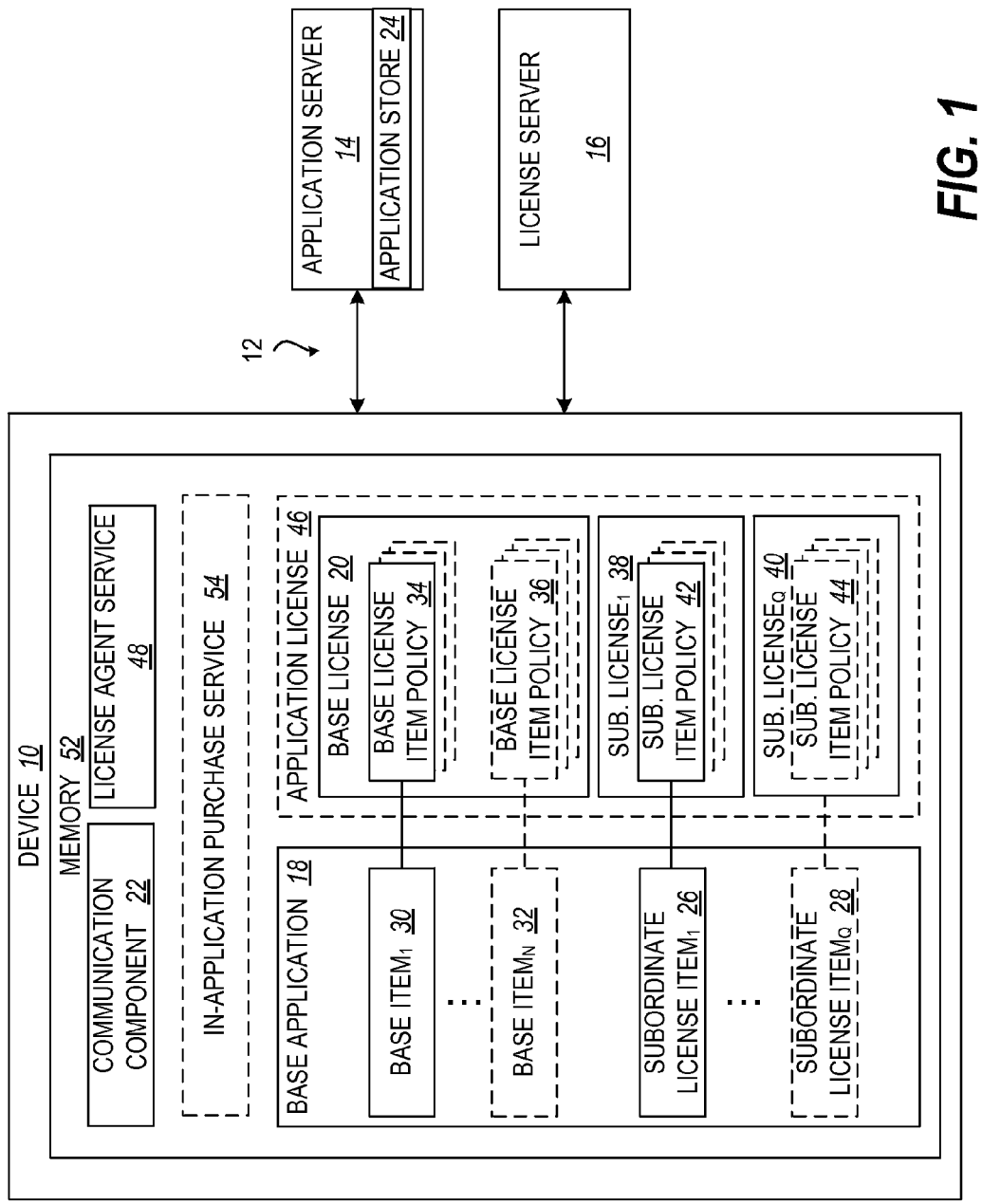
FIG. 1 illustrates a schematic diagram of a device at least intermittently networked to an application server and a license server, according to one aspect.

The described aspects relate to apparatus and methods that enable an application executed on a device (e.g., a communication device, mobile device, user equipment or wireless device), to manage the acquisition and licensing enforcement of additional application-related items via an in-application purchase service and a license agent service, respectively, on the device. Moreover, in some cases, the described aspects can enable licensing that is transferable between devices. As such, the described aspects alleviate a need for the application to handle all of the purchase, billing, provisioning, licensing enforcement and modification (e.g. upgrading, transferring, revoking, etc.) of subordinate licensable items and their corresponding license rights. In particular, the in-application service and the license agent service may be included in an application shop on the device to facilitate authenticating the base application to appropriate network entities, such as an application store, digital locker, etc., to acquire a validated subordinate license. Further, a license enforcement component on the device can assist in tracking the subordinate license rights, which may relate to consumable items or expansion items that provide additional content and/or service to the base application.

For example, in some aspect, the present apparatus and methods include in-application subordinate license acquisition, and device-based licensing enforcement. For instance, in one aspect, apparatus and methods of subordinate license acquisition relate to in-application-offers by a base application of subordinate licensable items, such as application consumable items or an expansion application. In one aspect, the base application is executed on a device and receives an input to acquire a subordinate licensable item. The in-application purchase service on the device conducts a transaction with an application server for the subordinate licensable item, and as a result the device receives a transaction receipt. In some aspects, based on the completion of the transaction, the subordinate license is automatically received, e.g. in a push fashion, from a network component in communication with the application server, such as a license server. In another aspect, the subordinate license may be retrieved by the device in a pull fashion, such as by using the transaction receipt, and optionally additional identifying information, to request the subordinate license from the license server. Accordingly, the base application may be subsequently executed according to the subordinate license so as to provide access to the subordinate licensable item, which may be added to the base application based on the transaction, or which may have been previously included in the base application but in a locked or otherwise inaccessible form.

In another aspect, apparatus and methods of license enforcement can include a base license that is stored for the base application that is executed on the device. The device acquires the subordinate license for the subordinate licensable item usable by the base application. A request is received to execute the base application. A licensing agent service on the device enforces the base license with respect to executing the base application. The base application enforces the subordinate license during execution of the base application.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

With initial reference to FIG. 1, an apparatus, depicted as a communication device 10 is at least intermittently networked for licensing via a network 12 to an application server 14 and a license server 16. A base application 18 executes on the device 10 subject to a base license 20. The base application 18 further initiates, via a communication component 22, a transaction with an application store 24 hosted by the application server 14 to obtain at least one (e.g. any number from 1 to Q, where Q is a positive integer) subordinate licensable item 26, 28 that is usable by the base application 20. Each subordinate licensable item 26, 28 can be like one or more (e.g. any number from 1 to N, where N is a positive integer) base items 30, 32 already usable by the base application 18 or of a different type or nature. As such, base application 18 can comprise one or more base items 30, 32 that are respectively subject to one or more base license item policies 34, 36 of the base license 20. Similarly, the one or more subordinate license items 26, 28 are subject, respectively, to one or more subordinate licenses 38, 40 respectively defined by one or more subordinate license policies 42, 44. The base license 20 and the one or more subordinate licenses 38, 40 can be collectively referred to as an application license 42. For example, in one aspect that should not be construed as limiting, base application 18 may be a game having basic features defined by one or more base items 30, 32, and the capabilities of the game may be expanded by unlocking or adding one or more subordinate licensable item 26, 28.

In one aspect, subordinate license items 26, 28 can comprise an expansion item, an unlocked feature item, a consumable inventory item, etc. For example, in an aspect, each subordinate licensable item 26, 28 comprises a consumable item having a value corresponding to use. In an additional aspect, the subordinate licensable items 26, 28 comprise a bundle of subordinate licensable items including at least one or more items that provide additional functionality or a consumable item usable by the base application.

It should be noted that as used herein, the term "application" may refer to content and/or a service, and an "item" such as a "base item" or a "subordinate license or licensable item" may include a content item or a service item, each respectively corresponding to a base item license and a subordinate item license. As such, a base item or subordinate license or licensable item may define one or more characteristics, features, or capabilities of the corresponding base application. Further, a base item license and a subordinate item license may each include one or more "policies" such as a rule, a condition, a parameter, instructions, etc., corresponding to desired functionality and/or licensing enforcement for the respective item.

As used in this disclosure, the term "content" includes, at least, any type of application, multimedia file, image file, executable, program, web page, script, document, presentation, message, data, meta-data, or any other type of media or information that may be rendered, processed, or executed on a device. Also, the term "service" includes, at least, providing of an action or an accommodation, including in electronic or non-electronic form. For example, in one aspect, a service may include providing access, such as access to a network server, access to a physical location such as a building, a restricted area, etc. For instance, in one aspect that should not be construed as limiting, a use case of providing access to a network server may include a scenario where a user is a player in a game, and access is provided to a network server to enable the user to participate in a network-based multi-player service for the game provided by the network server. Additionally, for instance, in an aspect that should not be construed as limiting, a use case of providing access to a physical location may include providing access and/or a membership to a gym.

As used in this disclosure, the term "license" is used to describe an enabling key, datum, object, or authenticated message that allows use of a licensable item. The license can be a specific implementation of Data Rights Management (DRM) executed by the license agent service on the device with at least intermittent coordination with the server. DRM, and thus the term license as used herein, can refer to access control technologies that are used by hardware manufacturers, publishers, copyright holders and individuals to limit the use of digital content such as licensable content as well as devices. The license can be used to describe any technology that inhibits uses of licensable content in a manner that is not desired or intended by an originating or distributing content provider. Moreover, a license may include one or more policies or policy objects, which may correspondingly define one or more rules, conditions, parameters, or instructions that characterize the license.

Further, in an aspect, the device 10 or a component thereof, such as base application 18, may receive a transaction receipt corresponding to the transaction to obtain or enable access to each subordinate licensable item 26, 28. Further, the device 10 or a component thereof, such as a license agent service 48, may obtain, from the license server 16 via the communication component 22, a subordinate license 38, 40 that corresponds to the acquired subordinate licensable item 26, 28. In an aspect, the license agent service 48 can obtain the subordinate license 38, 40 by automatically receiving the subordinate license from the license server 16 in response to a completion of the transaction. In another aspect, an in-application purchase service 50 on the device 10 receives the transaction receipt from the base application 10 and may determine identifying information corresponding to the base application 10 for forwarding a license request including the identifying information and the transaction receipt for the subordinate licensable item 26, 28 to the license server 14, and for receiving the subordinate license 38, 40 in response to the license request. In an exemplary aspect, the identifying information of the base application 18 enable validation of the base application 18 on the device 10 by a network boundary server, and wherein the transaction receipt enable authentication of the transaction.

The license service agent 48 may also receive a license status query from the base application and forward an indication of existence of the subordinate license corresponding to the base application 18 to the base application 18.

In another aspect, provisioning the device 10 with the subordinate license can be by validating the subordinate licensable item 26, 28 received from the license server 16.

In a further aspect, the license agent service 48 may further obtain the subordinate license 38, 40 by receiving an unlocking code for the subordinate licensable item 26, 28 comprising a locked feature of the base application 18.

In an additional aspect, the license agent service 48 may obtain the subordinate licensable item 26, 28 by obtaining an expansion item that is executable with the base application 18 to provide the base application 18 with the additional functionality.

In another aspect, the license agent service 48 may provision the device 10 with the subordinate license 38, 40 by validating the subordinate licensable item 26, 28 received from the license server 16.

In yet another aspect, the license agent service 48 may synchronize, via the communication component 22, the base application 18 and the subordinate license 38, 40 with the license server 16.

In another aspect, the license agent service 48 may define a single license agent service at the device 10 that can enforce all of the licenses, e.g. one or more application licenses 46 including one or more base licenses 20 and one more subordinate licenses 38 and 40, and their corresponding policies, e.g. base license item policy 34 and 36, and subordinate license policy 42 and 44, for any licensed items, e.g. one or more base applications 18 and one or more subordinate license items 26 and 28, used on the device 10. Further, according to an example, such a single license manager or license agent service may be configured to operate with different types of content, different types of services, content or services from different licensing authorities or systems, etc. In other words, in this aspect, the license agent service 48 may function as a universal or generic license manager or license agent service, thereby eliminating or reducing the need for a plurality of different license managers or agents specific to different types of content or services, different licensing authorities, or different licensing systems.

In yet a further aspect relating to a transfer of the application and/or base item license and one or more subordinate item licenses, the device 10 sends an identifier for the device 10 or a subscription to the license server 16 and the device 10 receives the base application license 20 and each subordinate license 38, 40 transferred from another device being replaced or from another device that corresponds to the subscription. For example, in an aspect, the license agent service 48 may identify a second device that is associated with a subscription for the base license 20 and the subordinate license 38, 40 on the device 10 comprising a first device, and for transferring the base license 20 and the subordinate license 38, 40 to the second device.

In one aspect, a memory 52 stores the base license 20 for the base application 18 on the device 10. Memory 52 may also optionally include the in-application purchase service component 54 for acquiring, by the device 10, the subordinate license 38, 40 for the subordinate licensable item 26, 28 usable by the base application 18. Memory 52 may also optionally include the license agent service 48 on the device 10 that receives a request to execute the base application 18 and that enforces each base item licensing policy 34, 36 corresponding to the base license 20 with respect to executing the base application 18. In a further aspect, the base application 18 enforces each subordinate item licensing policy 42, 44 corresponding to the subordinate license 38, 40 during execution.

In one aspect, the license agent service 48 enforces the base license 20 for the base application 18 on the device 10 by synchronizing the base license 20 with the license server 16.

In another aspect, the license agent service 48 may track usage of each subordinate licensable item 26, 28 that is a consumable item.

In another aspect, the license agent service 48 may receive a query from the base application 18, and responds with license details of each subordinate license 38, 40. Further, for example, the license agent service 48 may receive an enforcement query from the base application 18, and responds to the enforcement query with license details of the subordinate license 38, 40.

In yet an additional aspect, the license service agent 48 is further for revoking the subordinate license 38, 40 in response to detecting revocation of the base license 18.

Thus, communication device 10 manages the acquisition and licensing enforcement of additional application-related items via an in-application purchase service 54 and a license agent service 48, respectively, on the device.

Figure 2:
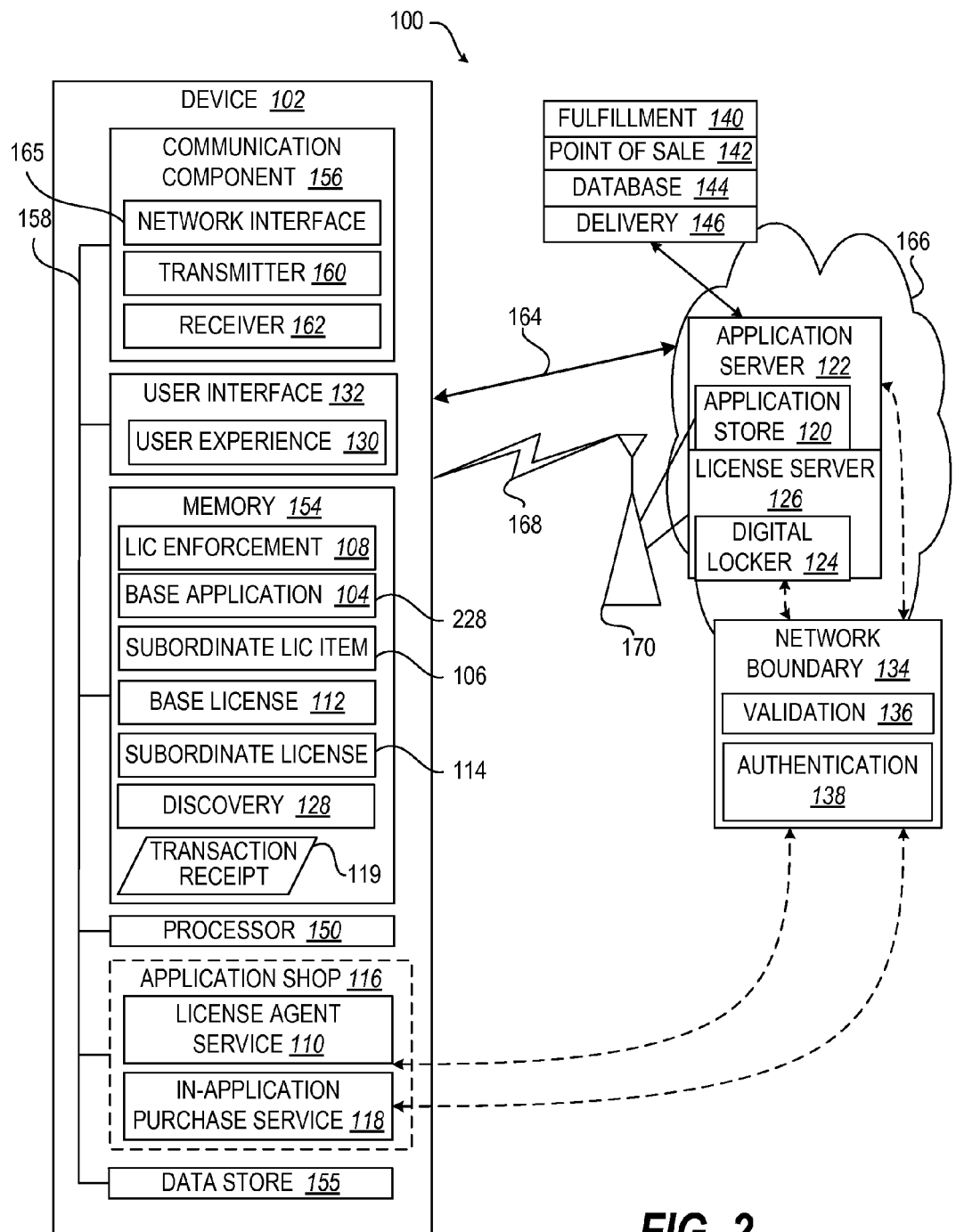
FIG. 2 illustrates a schematic diagram of communication system for a device that performs in-application licensing, according to one aspect.

In a more detailed example, the communication device 10 of FIG. 1 may take the form of device 102 operating in a communication system 100 depicted in FIG. 2, wherein similar terminology as that in FIG. 1 relates to similar components. For example, apparatus or device 102, such as user equipment, a wireless device, or a communication device, enables at least one third-party application, depicted as a base application 104, to expand, augment or upgrade its features with one or more subordinate licensable items 106. Thus, the one or more subordinate licensable items 106 are related to the base application 104.

To that end, an application license enforcement component 108 communicates with a licensing agent service 110 to execute the base application 104. It should be noted that in some aspects, application license enforcement component 108 may be a component of licensing agent service 110, or vice versa. In particular, the base application 104 cannot execute if licensing agent service 110 does not find a base license 112. Further, in conjunction with executing the base application 104, the application license enforcement component 108 can obtain one or more corresponding subordinate licenses 114 from the licensing agent service 110. Accordingly, during execution, the base application 104 enforces the one or more subordinate licenses 114 within the base application 104. Alternatively, the licensing agent service 110 or the application license enforcement component 108 can assist the base application 104 in enforcing the one or more subordinate licenses 114.

In one aspect, the base application 104 stores references to subordinate licenses 114 or upon execution fetches the subordinate licenses 114 anew from the licensing agent service 110. In some aspects, the application license enforcement component 108 can fetch the subordinate licenses 114 but not do the actual enforcement, e.g. in the case where base application 104 performs all or some portion of the licensing enforcement.

The licensing agent service 110, which can reside within an application shop component 116, maintains the base license 112 and the one or more subordinate licenses 114, and can enforce the base license 112 with respect to execution of the base application 104.

Additionally, an in-application purchasing service 118, which may be located within the application shop component 116, provides an interface to an application store 120 on an application server 122 and enables acquisition of one or more subordinate licensable items 106 (e.g., expansion applications), and a corresponding one or more subordinate licenses 114, related to the base application 104. The one or more subordinate licenses 114 can be separately acquired, for example, in some instances from a digital locker 124 on a license server 126.

The base application 104 can provide a discovery component 128 that allows a user to discover subordinate licensable items 106 via a user experience 130 on a user interface 132 of the device 102, which can further entail interfacing with the application store 120 via the in-application purchase service 118 of the application shop component 116. For instance, the in-application purchase service 118 can obtain a transaction receipt 119 for the one or more subordinate licensable items 106 that are thereby purchased.

A network boundary component 134 can provide a validation service 136 for identifying the base application 104 to avoid being spoofed by an application that is not entitled to acquire subordinate licensable items 106. For example, network boundary component 134 may be an authorization entity having device-specific and/or network- or application server-specific information, such as relationships between valid device identifiers, valid base application identifiers, valid base item licenses, valid subordinate item licenses, etc. Further, for instance, the validation service 136 can match a identifier of the base application 104, such as a class identifier, that makes the request to one of an original set of (class) identifiers to validate the requesting base application 104. Also, the network boundary component 134 can provide an authentication service 138 that authenticates the transaction receipt 119.

A fulfillment component 140, which can be integral to or separate from the application store 120, interacts with the application server 122 to obtain the one or more subordinate licensable items 106 (e.g. in cases where such items comprise an addition to the base application as opposed to unlocking an existing item) and the corresponding or associated one or more subordinate licenses 114 and to provide the transaction receipt 119.

The application store 120 can provide information on the base applications 104 and subordinate licensable items 106 that are available. The application store 120 can also provide a point of sale (POS) component 142 that provides purchasing functionality, including providing the transaction receipt 119.

The application server 122 can comprise a database 144 of base applications 104 and corresponding base licenses 112, as well as subordinate licensable items 106 and corresponding subordinate licenses 114, such as for allowing the device 102 to synchronize licenses. A delivery component 146 can deliver applications or licenses to the device 102.

With continuing reference to FIG. 2, in one aspect, the device 102 may include a processor 150 for carrying out processing functions associated with one or more of components and functions described herein. Processor 150 can include a single or multiple set of processors or multi-core processors as part. Moreover, processor 150 can be implemented as an integrated processing system and/or a distributed processing system, depicted as a computing platform 152.

Device 102 further includes a memory 154, such as for storing local versions of applications being executed by processor 150. Memory 154 can include any type of memory usable by a computer, such as random access memory (RAM), read only memory (ROM), tapes, magnetic discs, optical discs, volatile memory, non-volatile memory, and any combination thereof. For instance, the memory 154 can at least in part comprise a data store 155, which can be any suitable combination of hardware and/or software, that provides for mass storage of information, databases, and programs employed in connection with aspects described herein. For example, data store 155 may be a data repository for applications not currently being executed by processor 150.

Further, device 102 includes a communications component 156 that provides for establishing and maintaining communications with one or more parties utilizing hardware, software, and services as described herein. Communications component 156 may carry communications between components on device 102, as well as between device 102 and external devices, such as devices located across a communications network and/or devices serially or locally connected to device 102. For example, communications component 156 may include one or more buses 158, and may further include transmit chain components and receive chain components associated with a transmitter 160 and a receiver 162, respectively, operable for interfacing with external devices. For another example, communications component 156 may communicate to external devices via a network interface 165. The device 102 can link at least in part via either a wired link 164 to a network 166 or at least in part via a wireless or cellular link 168 to an access network 170.

Device 102 may additionally include a user interface 132 operable to receive inputs from a user of device 102 and further operable to generate outputs for presentation to the user. User interface 132 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 132 may include one or more output devices, including but not limited to a display, a speaker, a haptic feedback mechanism, a printer, any other mechanism capable of presenting an output to a user, or any combination thereof.

Resident in memory 154, data store 155 or both, aspects of the device 102 can incorporate the application license enforcement component 108, base application 104, subordinate licensable item 106, base license 112, subordinate license 114, and application shop component 116.

In FIGS. 3A-3D, the present disclosure provides at least one aspect of a method 200 for performing licensing on a device. With initial reference to FIG. 3A, acquiring in-application licensable items is depicted at 202. A base application is executed on a device (block 204). The base application initiates a transaction with an application store to obtain a subordinate licensable item that is usable by the base application (block 206). The device receives a transaction receipt corresponding to the transaction for the subordinate licensable item (block 208). A license agent service obtains, from a license server, a subordinate license that corresponds to the subordinate licensable item (block 210).

After acquiring the in-application license, the base application optionally can be executed according to the subordinate license (block 211).

In one aspect, obtaining the subordinate license further comprises receiving an unlocking code for the subordinate licensable item comprising a locked feature of the base application.

In another aspect, the subordinate licensable item comprises a consumable item having a value corresponding to use.

In an additional aspect, obtaining the subordinate licensable item further comprises obtaining an expansion item that is executable with the base application to provide the base application with the additional functionality.

In a further aspect, the method 200 can comprise provisioning the device with the subordinate license by validating the subordinate licensable item received from the license server.

In yet another aspect, the subordinate licensable item comprises a bundle of subordinate licensable items including at least one or more that provide additional functionality or a consumable item usable by the base application.

In another aspect, a license agent service can synchronize, via a communication component, the base application and the subordinate license with the license server.

In an additional aspect, the method 200 can further comprise sending an identifier for a device or a subscription to the license server, and receiving a base application license and the subordinate license transferred from another device being replaced or that corresponds to the subscription.

Figure 3A:
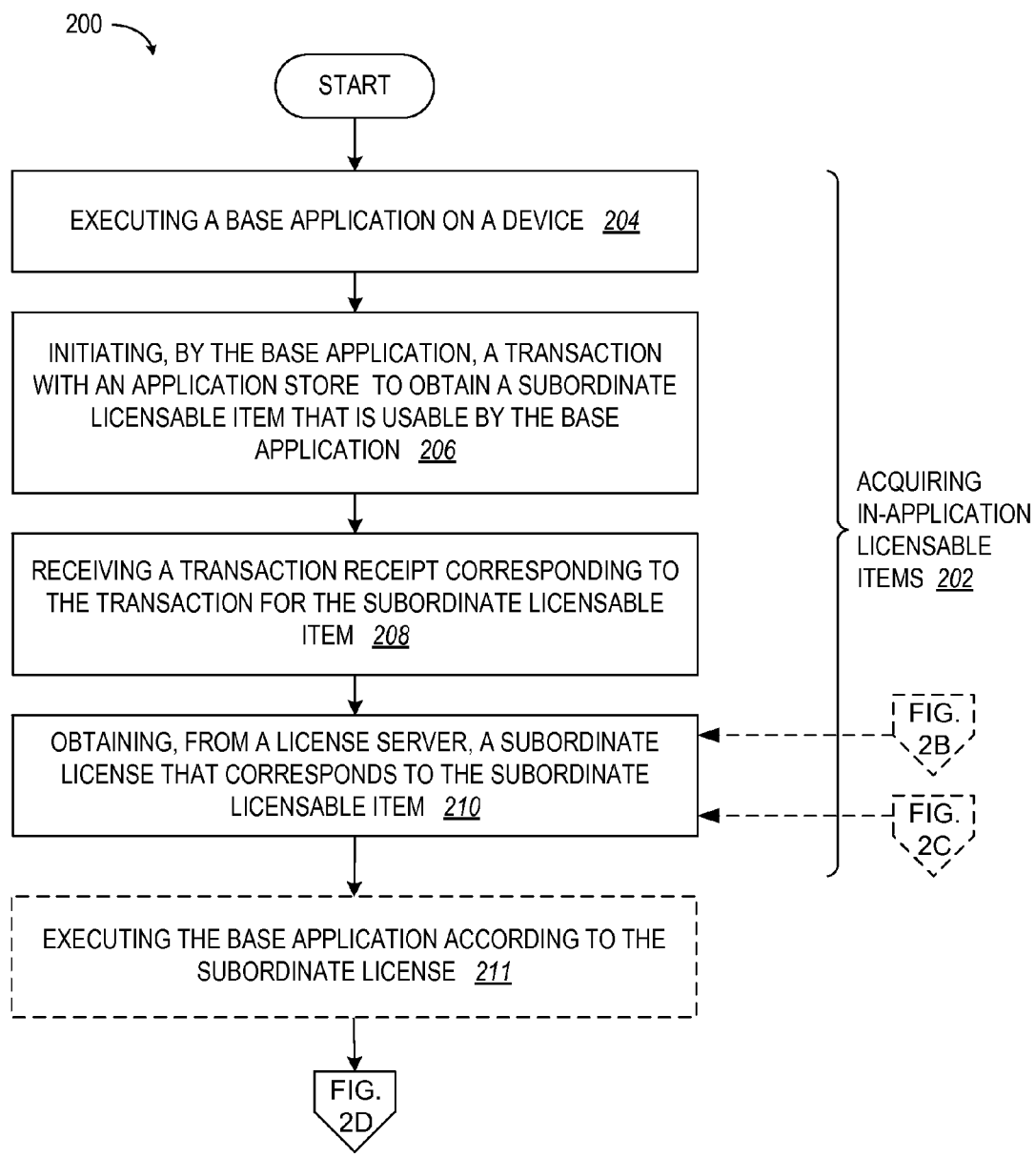
FIGS. 3A-3D illustrate a flow diagram for a method of acquiring in-application licensable items and enforcing an in-application subordinate license, according to one aspect.
Figure 3B:
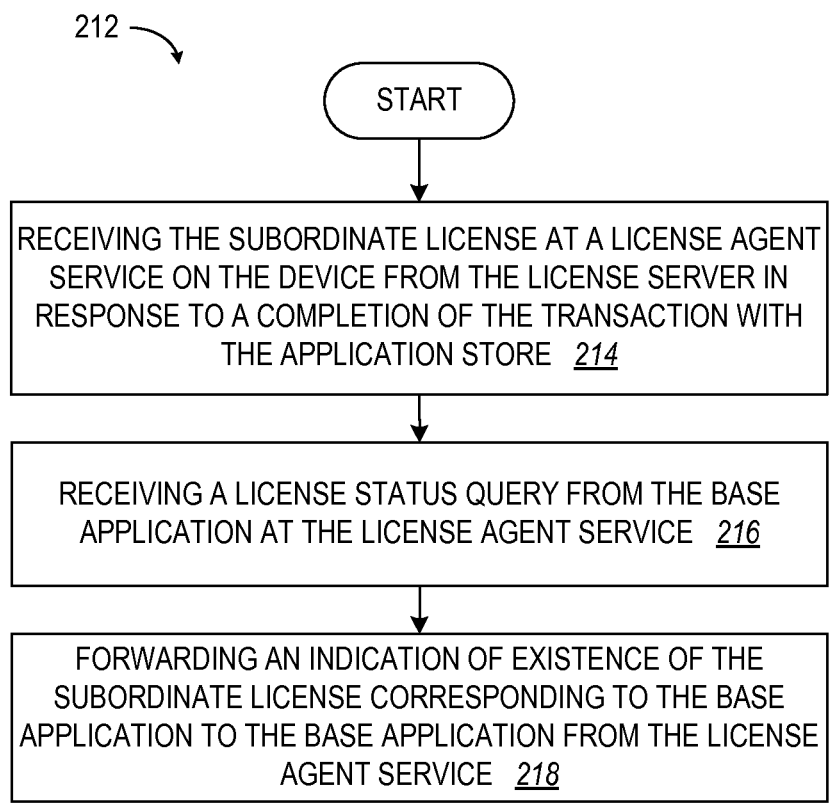

Continuing with reference to FIG. 3B, the obtaining of the subordinate license 210 (FIG. 3A) in one alternative aspect is depicted at 212. A license agent service on the device receives the subordinate license from the license server in response to a completion of the transaction with the application store (block 214). The license agent service receives a license status query from the base application (block 216). The license agent service forwards an indication of existence of the subordinate license corresponding to the base application to the base application from the license agent service (block 218).

Figure 3C:
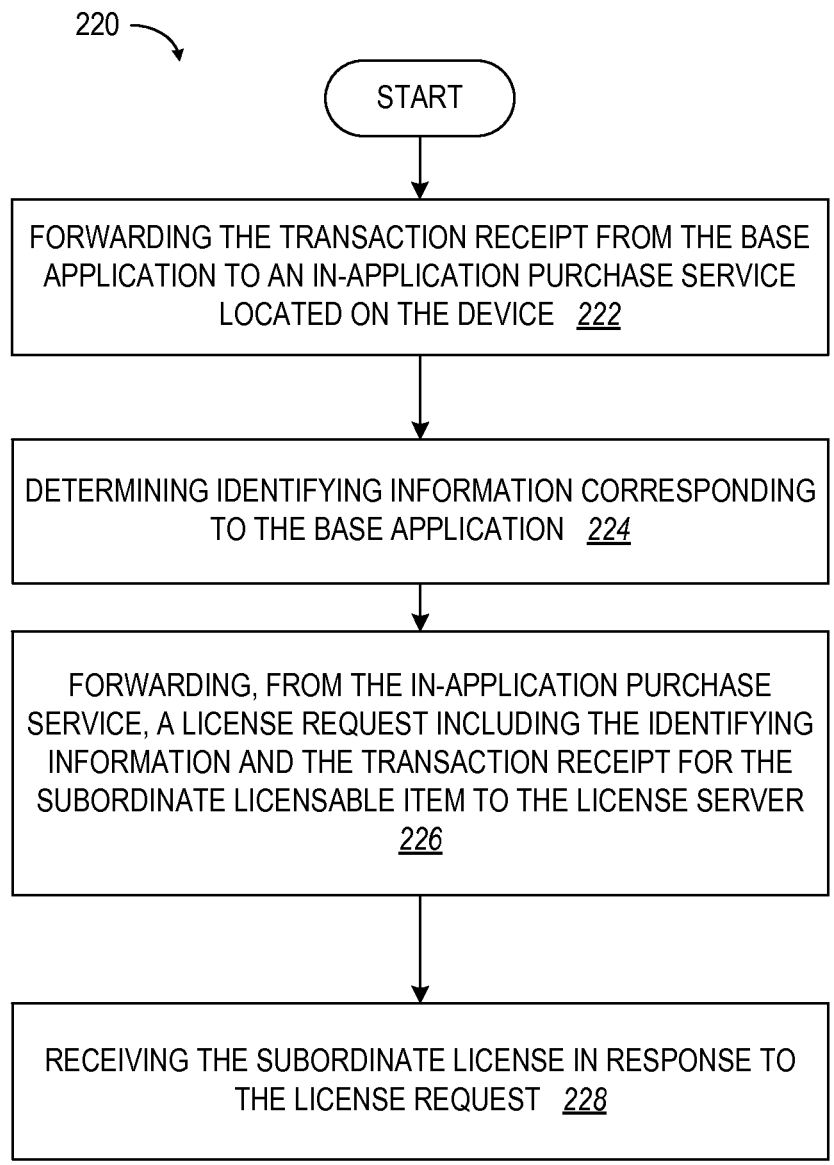

Continuing with reference to FIG. 3C, the obtaining of the subordinate license 210 (FIG. 3A) in another alternative aspect is depicted at 220. An in-application purchase service located on the device receives the transaction receipt from the base application (block 222). The in-application purchase service determines identifying information corresponding to the base application (block 224). The in-application purchase service forwards a license request including the identifying information and the transaction receipt for the subordinate licensable item to the license server (block 226). The license agent service receives the subordinate license in response to the license request (block 228).

In an exemplary aspect, the identifying information of the base application enables validation of the base application on the device by a network boundary server, and wherein the transaction receipt enables authentication of the transaction.

Figure 3D:
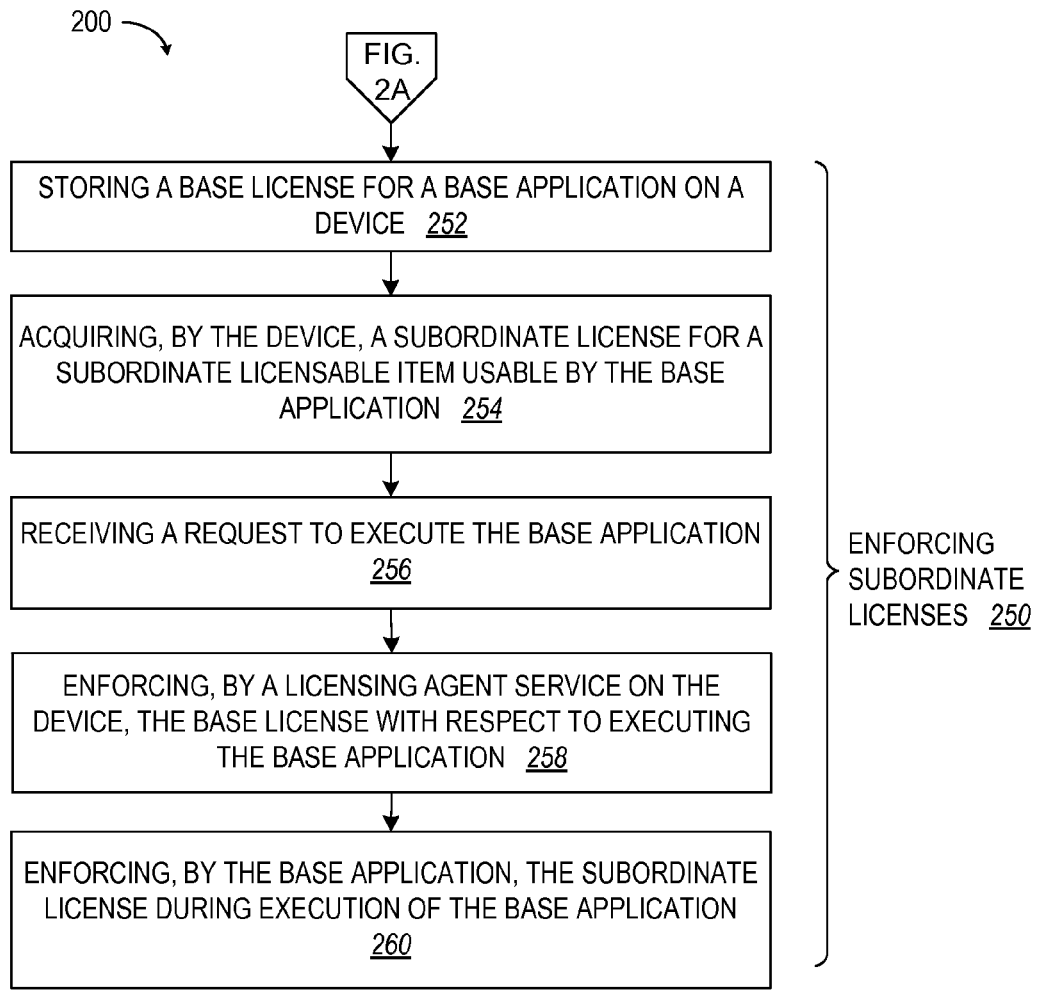

Continuing with reference to FIG. 3D, one aspect of enforcing a subordinate license is depicted at 211 for the aspect of method 200. A base license for a base application is stored on a device (block 252). The device acquires a subordinate license for a subordinate licensable item that is usable by the base application (block 254). A request is received to execute the base application (block 256). A licensing agent service on the device enforces the base license with respect to executing the base application (block 258). The base application enforces the subordinate license during execution of the base application (block 260).

In one aspect, enforcing the base license for the base application on the device is by synchronizing the base license with a server.

In another aspect, the license agent service on the device can track the subordinate licensable item comprising a consumable item.

In a further aspect, the subordinate licensable item can comprise a bundle of subordinate licensable items.

In yet another aspect, the method 200 can further comprise identifying a second device that is associated with a subscription for the base license and the subordinate license on the device comprising a first device, and transferring the base license and the subordinate license to the second device.

In yet an additional aspect, the method 200 can further comprise receiving a query from the base application, and responding, by a license agent service, with license details of the subordinate license.

In another aspect, the license agent service on the device can receive an enforcement query from the base application, respond with license details of the subordinate license.

In yet further aspect, the license agent service can revoke the subordinate license in response to detecting revocation of the base license.

Figure 4:
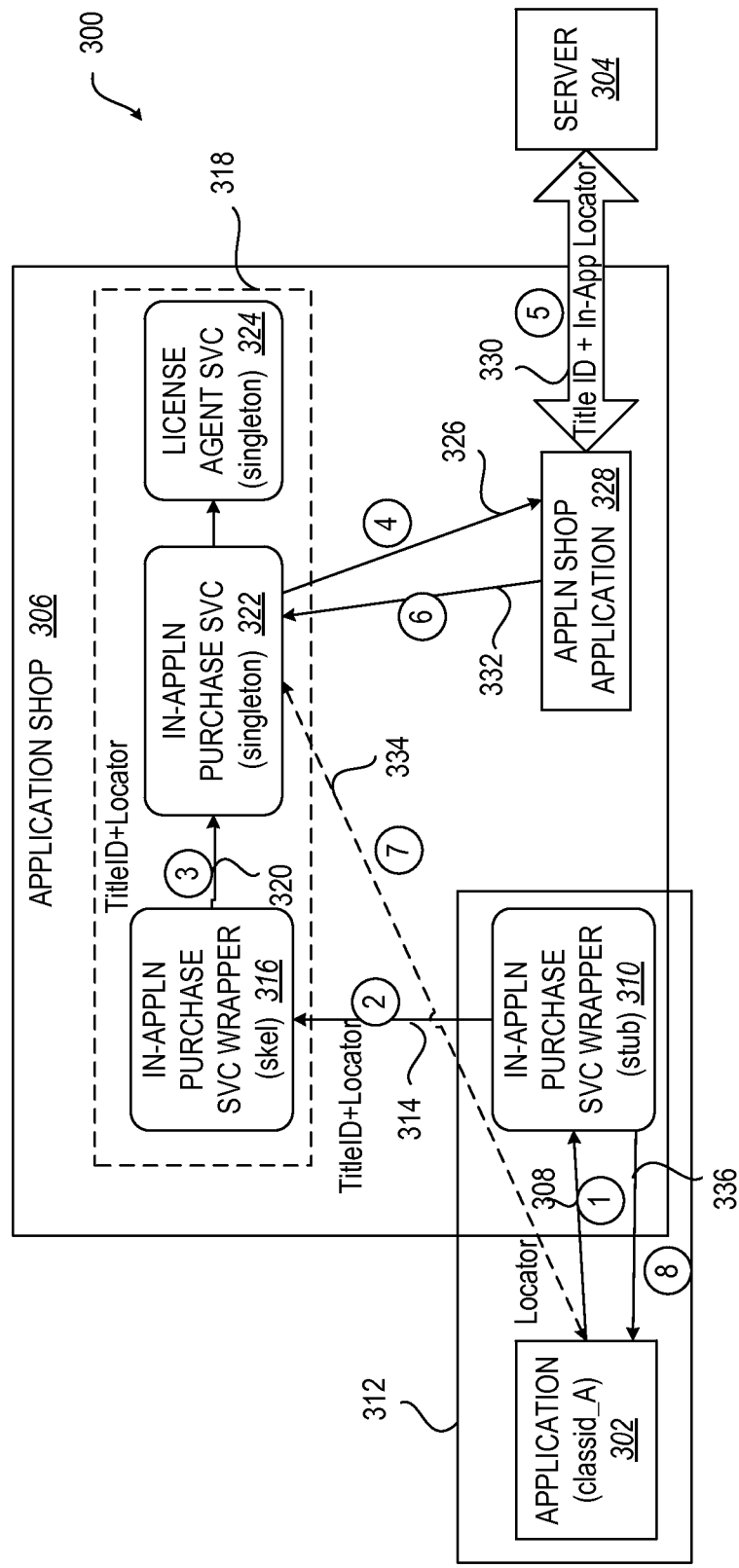
FIG. 4 illustrates a block diagram of a communication system for acquiring in-application licensing, according to one aspect.

In FIG. 4, in a specific use case example in an exemplary communication system 300, which should not be construed as limiting, an application 302 having ClassID_A performs an in-application purchase at a server 304 via an application shop 306. In a first state as depicted at 308, an in-application purchase interface (e.g., service wrapper (stub)) 310 of an application compilation 312 is generated. In a second state as depicted at 314, the TitleID and locator for the application 302 is sent to an in-application purchase interface (e.g., service wrapper (skel)) 316 of a suite 318 of services of the application shop 306. In a third state as depicted at 320, the TitleID and locator are transferred to an in-application purchase service (singleton) 322, which can operate in conjunction with a license agent service (singleton) 324. The in-application purchase service (singleton) 322 communicates at a fourth state as depicted at 326 to an application shop application 328. In a fifth state as depicted at 330, the TitleID and in-application locator are communicated to the server 304. With the application 302 validated, the application shop application 328 in a sixth state as depicted at 332 communicates with the in-application purchase service (singleton) 322, which in turn communicates with the application 302 in a seventh state as depicted at 334. In an eighth state as depicted at 336, the in-application purchase interface (e.g., service wrapper (stub)) 310 communicates with the application 302.

Figure 5A:
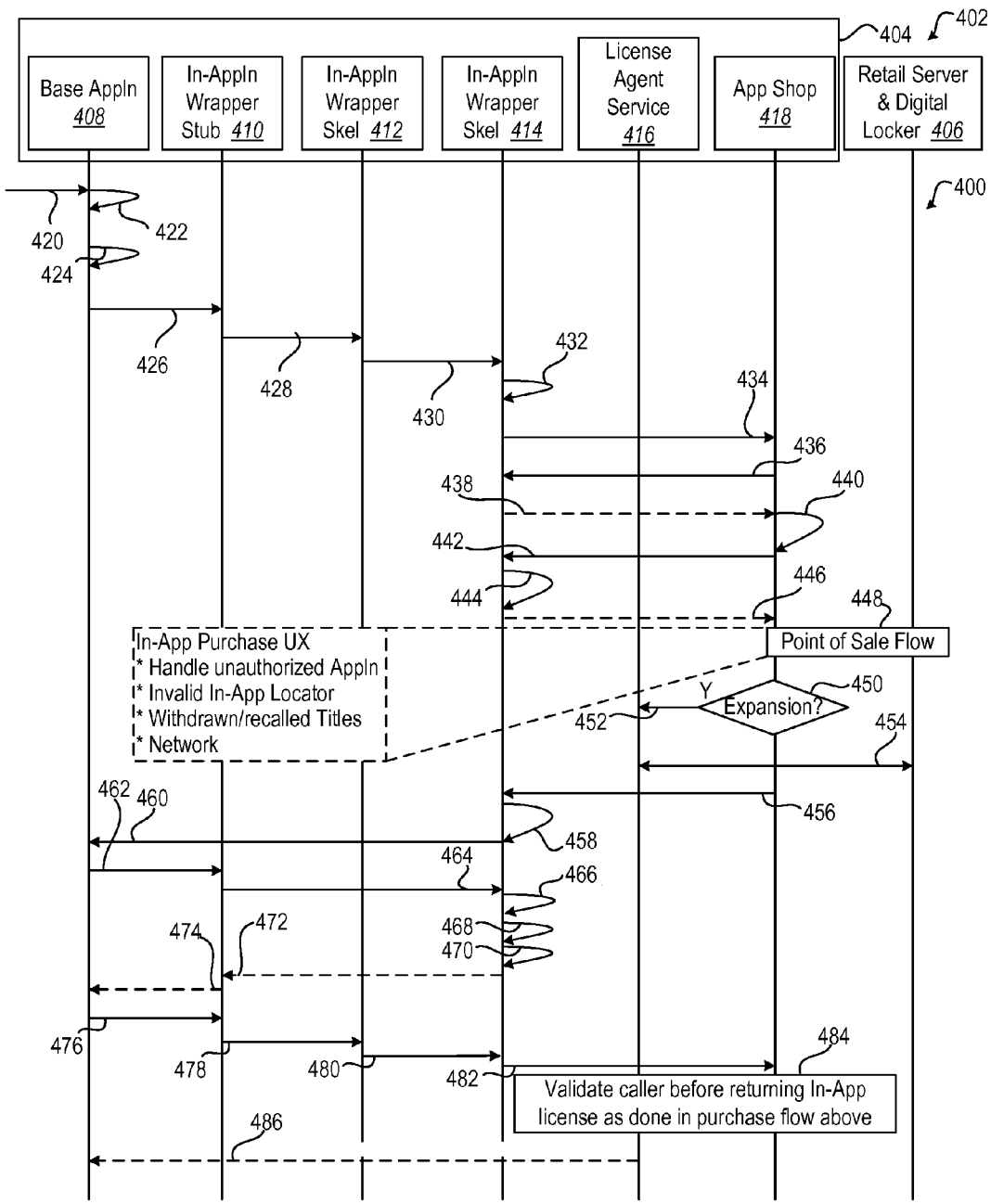
FIG. 5A illustrates a timing diagram for an exemplary methodology for in-application licensing, according to one aspect.

In FIG. 5A, a specific use case example, which should not be construed as limiting, includes an aspect of a method 400 for a communication system 402 of a device 404 to provide for licensing of in-application purchased expansions, upgrades or consumable material by communicating with a retail server and digital locker 406. The device 404 comprises a base application 408, an in-application wrapper stub 410, in-application wrapper skel 412, in-application service 414, license agent service 416, and application shop 418.

As depicted at 420, a user action is received at the base application 408. At 422, the base application 408 creates a purchase order (PO). At 424, the base application 408 creates a signal. At 426, the base application 408 sends IPG_InitPurchase (PO, signal) to the in-application wrapper stub 410. At 428, the in-application wrapper stub 410 sends InitPurchase to the in-application wrapper skel 412. At 430, the in-application wrapper skel 412 sends InitPurchase to the in-application service 414, which in turn at 432 creates TxID. At 434, the in-application service 414 sends IAppletCtl_BrowseURL( ) to the application shop 418. In 436, the application shop 418 responds to the in-application service 414 with InApp_GetTransactionIDs. At 438, the in-application service 414 sends TxID details to the application shop 418. At 440, the application shop 418 takes ClassID from TitleID and then at 442 responds to the in-application service 414 with InApp_GetTransactionIDs. At 444, the in-application service 414 grabs ClassID from privset and at 446 returns yes/no to the application shop 418. Point of sale flow (block 448) is performed between the application shop 418 and the retail server and digital locker 406, which can entail an in-application user experience (UX) of handling unauthorized application, handling invalid in-application locator, withdrawing or recalling titles, and communicating with a network.

A determination is made whether the purchase entails an expansion of the base application 408. If so, the application shop 418 forces the license agent service 416 to synchronize as depicted at 452. In response at 454, the license agent service 416 and the retail server and digital locker 406. At 456, the application shop 418 sends InApp_PostTxStatus (TxID, ClassID, sold) to the in-application service 414, which in turn writes Tx status as depicted at 458. At 460, the in-application service 414 signals the base application 408. At 462, the base application 408 sends IPG_GetOrderStatus (PO) to in-application wrapper stub 410. At 464, the in-application wrapper stub 410 sends GetOrderStatus to the in-application service 414. At 466, the in-application service 414 performs lookup TxID based on PO and locator. At 468, the in-application service 414 performs grab ClassID from TxID and see if privset. At 470, the in-application service 414 retrieves order status. At 472, the in-application service 414 returns order status to the in-application wrapper stub 410. At 474, the in-application wrapper stub 410 returns order status to the base application 408. At 476, the base application 408 sends IPG_QueryLicense (title locator) to the in-application wrapper stub 410. At 478, the in-application wrapper stub 410 sends QueryLicenses to in-application wrapper skel 412. At 480, the in-application wrapper skel 412 sends IPlazaLicense to in-application service 414. At 482 the in-application service 414 sends GetInAppLicenses (title locator) to the application shop 418. At block 484, the application shop 418 validates caller before returning in-application license as done in purchase flow above. At 486, the application shop 418 sends valid in-application licenses to the base application 408.

Figure 5B:
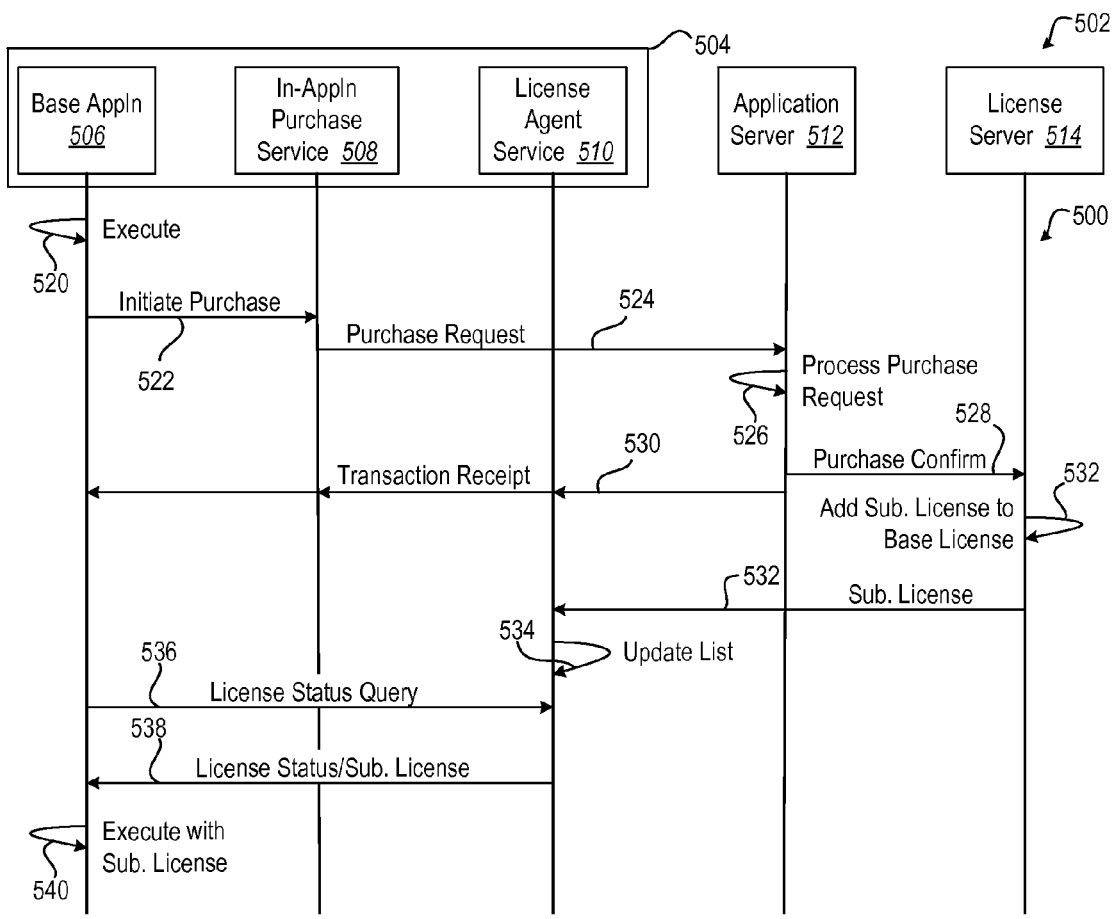
FIG. 5B illustrates a timing diagram for in-application licensing, according to another aspect.

In FIG. 5B, a specific use case example, which should not be construed as limiting, includes an aspect of a methodology 500 for licensing in a communication system 502 including a device 504 having a base application 506, an in-application purchasing service 508, and license agent service 510, wherein the device 504 may be networked at least intermittently to an application server 512 and a license server 512. The base application 506 is executed as depicted at 520. The base application 506 initiates a purchase of subordinate licensable item(s) utilizing the in-application purchasing service 508 as depicted at 522. The in-application purchasing service 508 sends a purchase request to the application server 512 as depicted at 524, which in turn processes the purchase request as depicted at 526. Then, the application server 512 sends a purchase confirmation as depicted at 528 to the license server 514 and sends a transaction receipt to the base application 506 as depicted at 530. The license server 514 adds the subordinate license to the base license as depicted at 532. The subordinate license is sent from the license server 514 to the license agent service 510 as depicted at 532, which responds by updating its list as depicted 534. Then, the base application 506 can send a license status query to the license agent service 510 as depicted at 536, which responds as depicted at 538 with the license status/subordinate license. Then, the base application 506 executes with the subordinate license as depicted at 540.

Figure 5C:
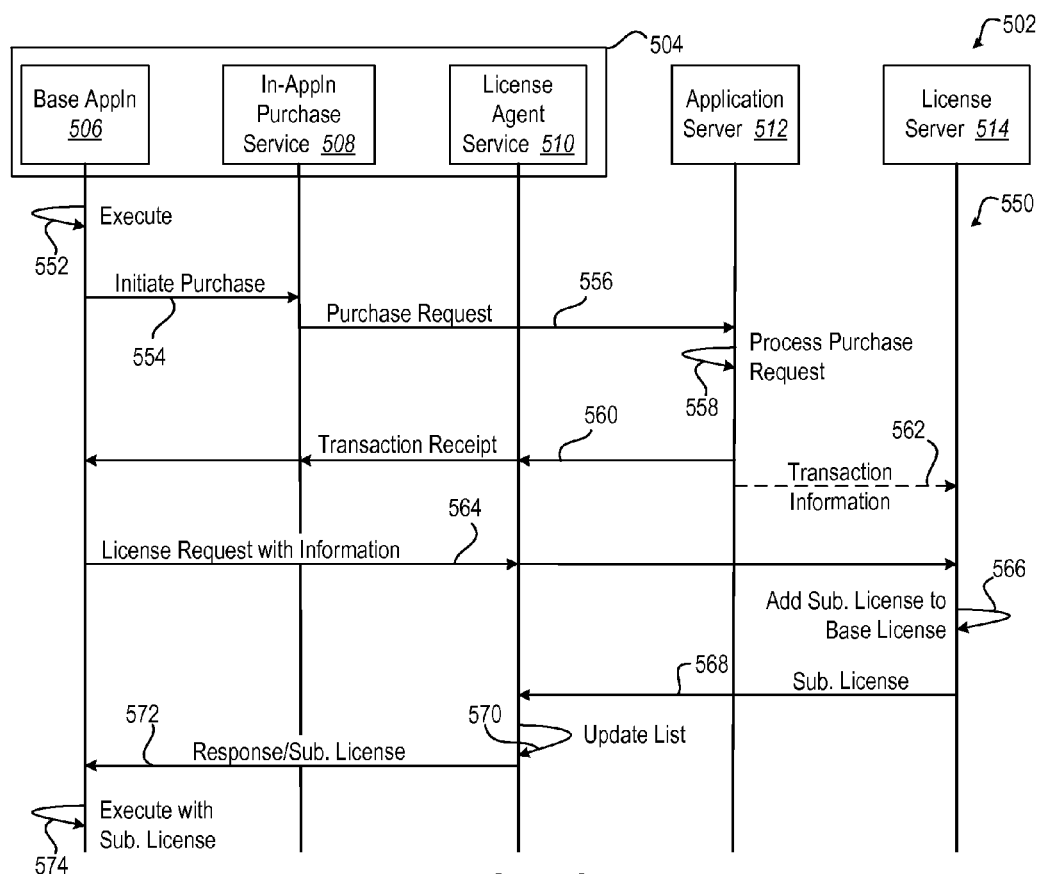
FIG. 5C illustrates a timing diagram for in-application licensing, according to a further aspect.

In FIG. 5C, a methodology 550 is depicted for the communication system 502 of the device 504 of the base application 506, in-application purchasing service 508, and license agent service 510 that performs license by networked at least intermittently to the application server 512 and license server 512. The base application 506 is executed as depicted at 552. The base application 506 initiates a purchase of subordinate licensable item(s) utilizing the in-application purchasing service 508 as depicted at 554. The in-application purchasing service 508 sends a purchase request to the application server 512 as depicted at 556, which in turn processes the purchase request as depicted at 558. Then, the application server 512 sends a transaction receipt to the base application 506 as depicted at 564. In one aspect, the application server 512 sends a transaction information as depicted at 562 to the license server 514. The base application 506 sends a license request with information to the license server 514 as depicted at 564. The license server 514 adds the subordinate license to the base license as depicted at 566. The subordinate license is sent from the license server 514 to the license agent service. The license agent service 510 sends the response/subordinate license as depicted at 572 to the base application 506. Then, the base application 506 executes with the subordinate license as depicted at 574.

Figure 6:
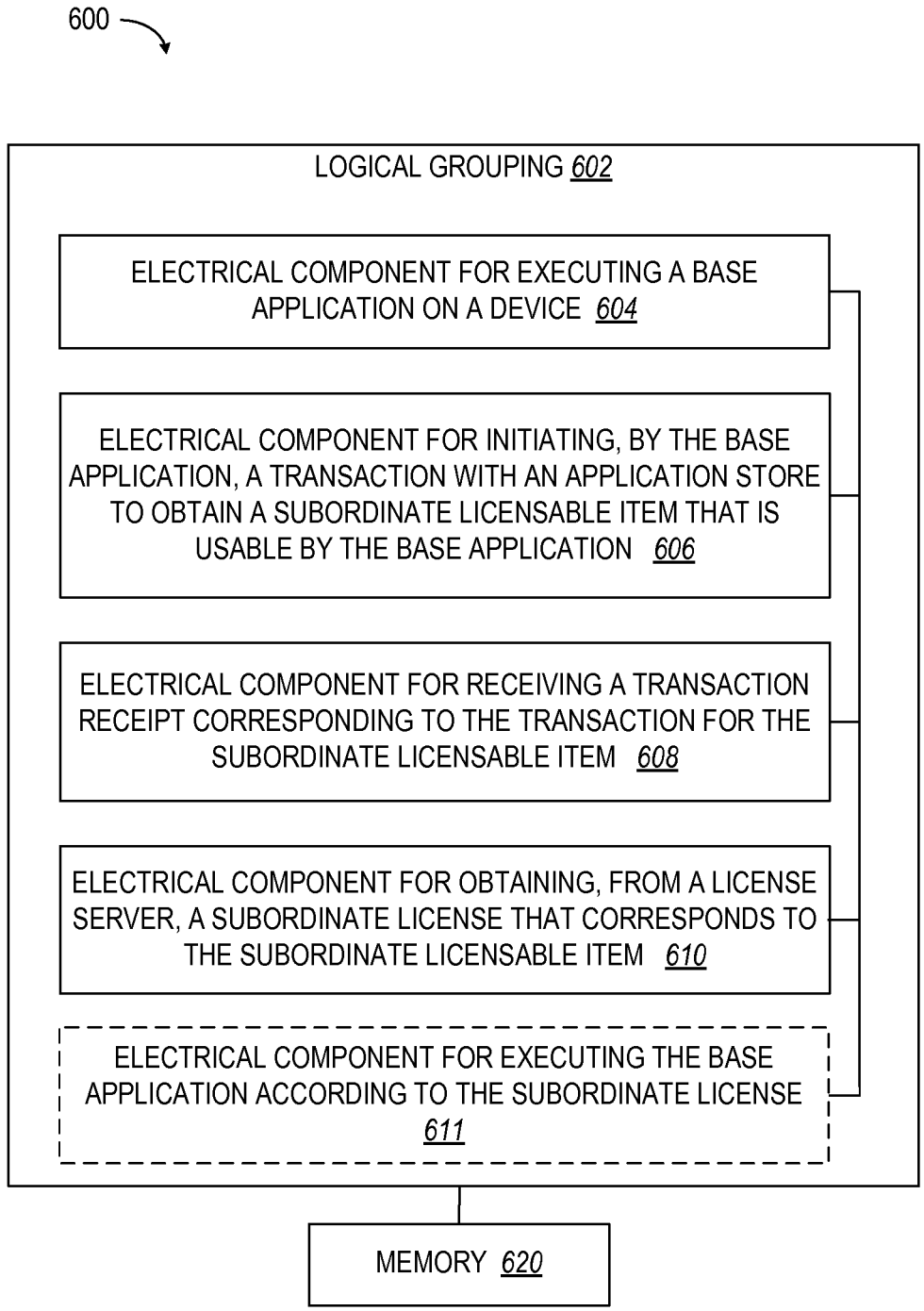
FIG. 6 illustrates a functional block diagram for a system of logical grouping of electrical components for acquiring subordinate licensing in a mobile communication environment, according to one aspect.

With reference to FIG. 6, illustrated is a system 600 for licensing on a device. For example, system 600 can reside at least partially within user equipment. It is to be appreciated that system 600 is represented as including functional blocks, which can be functional blocks that represent functions implemented by a computing platform, processor, software, or combination thereof (e.g., firmware). System 600 includes a logical grouping 602 of electrical components that can act in conjunction. For instance, logical grouping 602 can include an electrical component 604 for executing a base application on a device. For another instance, logical grouping 602 can include an electrical component 606 for initiating, by the base application, a transaction with an application store to obtain a subordinate licensable item that is usable by the base application. For an additional instance, logical grouping 602 can include an electrical component 608 for receiving a transaction receipt corresponding to the transaction for the subordinate licensable item. For another instance, logical grouping 602 can include an electrical component 610 for obtaining, from a license server, a subordinate license that corresponds to the subordinate licensable item. Optionally, logical grouping 602 can include an electrical component 611 for executing the base application according to the subordinate license. Additionally, system 600 can include a memory 620 that retains instructions for executing functions associated with electrical component 604-610. While shown as being external to memory 620, it is to be understood that one or more of electrical component 604-610 can exist within memory 620.

Figure 7:
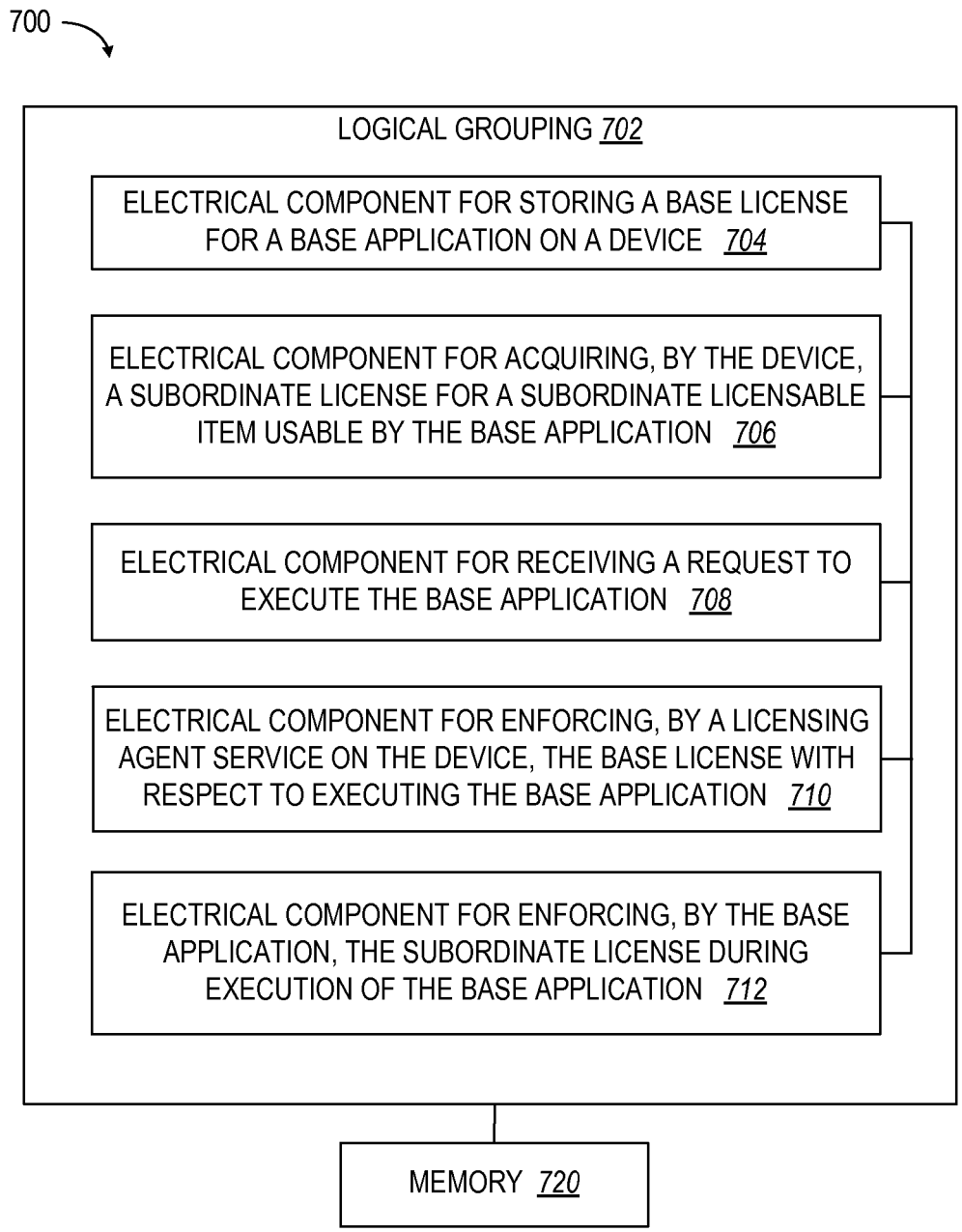
FIG. 7 illustrates a functional block diagram for a system of logical grouping of electrical components for enforcing subordinate licensing in a mobile communication environment, according to one aspect.

With reference to FIG. 7, illustrated is a system 700 for licensing on a device. For example, system 700 can reside at least partially within user equipment. It is to be appreciated that system 700 is represented as including functional blocks, which can be functional blocks that represent functions implemented by a computing platform, processor, software, or combination thereof (e.g., firmware). System 700 includes a logical grouping 702 of electrical components that can act in conjunction. For instance, logical grouping 702 can include an electrical component 704 for storing a base license for a base application on a device. For another instance, logical grouping 702 can include an electrical component 706 for acquiring, by the device, a subordinate license for a subordinate licensable item usable by the base application. For an additional instance, logical grouping 702 can include an electrical component 708 for receiving a request to execute the base application. For a further instance, logical grouping 702 can include an electrical component 710 for enforcing, by a licensing agent service on the device, the base license with respect to executing the base application. For another instance, logical grouping 702 can include an electrical component 712 for enforcing, by the base application, the subordinate license during execution of the base application. Additionally, system 700 can include a memory 720 that retains instructions for executing functions associated with electrical component 704-712. While shown as being external to memory 720, it is to be understood that one or more of electrical component 704-712 can exist within memory 720.

By virtue of the foregoing, it should be appreciated with the benefit of the present disclosure that subordinate licensable items can comprise consumable in-application material. For example, a consumable can refer to a virtual inventory item that gets exhausted during use of a base application as compared to a subordinate license that is exhausted as only a function of elapsed time. For instance, a purchase order is initiated by the base application and control transfers to a store user experience for the consumable. Full point of sale (POS) is in the application store. If purchased, a receipt is generated and delivered to the application.

The present innovation provides for a method and system for the application to establish trust with an application store so that the application can trust a receipt that the store generates during POS and delivers to the application.

The application fulfills the order related to the receipt. The application may communicate to its server to complete fulfillment and to transfer purchase details for later reconciliation.

The application can maintain an inventory for purchased consumable goods as decremented or reduced incrementally to zero. Alternatively or in addition, a license agent service can track purchased consumable goods.

In one aspect, a mechanism is provided for the application to query purchase history.

A simple test design can be used for developers to extract an in-application metadata file for their title, and use that to simulate positive and negative server responses.

Alternatively or in addition to consumable material, subordinate licensable items can comprise expansion in-application material. For instance, application expansion rights can be created on the server. The client device may synchronize ("sync") the rights using a license agent service. A license agent service can manage these rights on behalf of the initiating application, such as create, edit, delete, etc. A local license agent service can express expansion rights to the application. This may be through a local sync, always fetched from the server, or some hybrid behavior based on a policy. A base application can query its current active expansion licenses with the license agent service as required. The base application can enable or block the user experience based on expansion license(s) states of the subscriber. The license agent service can indirectly enforce expansion licenses during runtime.

When a base application license is revoked, its expansion licenses will be revoked. If applicable, refunds would also be made available to the subscriber. When an expansion license is revoked, the base application license and all non-dependent expansion licenses can remain intact.

Expansion licenses can have dependencies. Most basic dependency is each expansion on the base application license. This is a type of layered licensing.

Expansion licenses can be bundled and sold as a set of individual expansion rights or a single dependent expansion right.

Application can inactivate or reactivate an expansion license that is tied to usage or settlement, such as a subscription to all or part of the base application user experience.

Expansion licenses can be managed outside the application such as by the authenticated purchaser of the base application license who owns the application right. In one aspect, the authenticated purchaser can manage expansion licenses on an application store portal.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In addition, the term application as used herein refers to computer software program in general and can further encompass data, configuration settings, etc., used by the computer software program. Examples include utilities such as e-mail, Short Message Service (SMS) text utility, chat interface, web browsers, calculators, viewers, media players, games, etc. In an exemplary aspect, application can refer to software that is suitable for use on a mobile device, especially to being downloaded via a Wireless Local Access Network (WLAN) or Wireless Wide Area Network (WWAN).

For clarity, examples herein denote applications that are locally stored on user equipment, mobile devices, handset, access terminals, etc. However, implementations can encompass applications that are remotely stored. Similarly, for clarity distributing of the applications to the mobile devices can be described as being wirelessly downloaded from a WWAN or WLAN or P2P. However, implementations can include wired distribution, manual insertion of non-transitory computer readable storage medium, and unlocking a previously installed software object.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for licensing on a device, comprising:
   executing a base application on the device;
   initiating, by the base application, a transaction with an application store to obtain access to a subordinate licensable item that is usable by the base application;
   receiving a transaction receipt corresponding to the transaction for the subordinate licensable item;
   obtaining, from a license server, a subordinate license that corresponds to the subordinate licensable item in response to sending a license request including the transaction receipt for the subordinate licensable item to the license server; and
   receiving, by the base application, the subordinate license from a license agent service on the device in response to the base application sending a license status query to the license agent service.

2. The method of claim 1, wherein obtaining the subordinate license further comprises receiving the subordinate license at the license agent service on the device from the license server in response to a completion of the transaction with the application store.

3. The method of claim 2, further comprising:
   receiving the license status query from the base application at the license agent service; and
   forwarding the subordinate license corresponding to the base application to the base application from the license agent service.

4. The method of claim 1, wherein obtaining the subordinate license further comprises:
   forwarding the transaction receipt from the base application to an in-application purchase service located on the device;
   determining identifying information corresponding to the base application;
   forwarding, from the in-application purchase service, the license request including the identifying information and the transaction receipt for the subordinate licensable item to the license server; and
   receiving the subordinate license in response to the license request.

5. The method of claim 4, wherein the identifying information of the base application enables validation of the base application on the device by a network boundary server, and wherein the transaction receipt enables authentication of the transaction.

6. The method of claim 1, wherein the obtaining access to the subordinate license further comprises receiving an unlocking code for the subordinate licensable item comprising a locked feature of the base application.

7. The method of claim 1, wherein the subordinate licensable item comprises a consumable item having a value corresponding to use.

8. The method of claim 1, wherein the obtaining access to the subordinate licensable item further comprises obtaining an expansion item that is executable with the base application to provide the base application with additional functionality.

9. The method of claim 1, further comprising provisioning the device with the subordinate license by validating the subordinate license received from the license server.

10. The method of claim 1, wherein the subordinate licensable item comprises a bundle of subordinate licensable items including at least one or more that provide additional functionality or a consumable item usable by the base application.

11. The method of claim 1, further comprising synchronizing, by the license agent service via a communication component, the base application and the subordinate license with the license server.

12. The method of claim 1, further comprising:
    sending an identifier for a device or a subscription to the license server; and
    receiving a base application license and the subordinate license transferred from another device being replaced or that corresponds to the subscription.

13. The method of claim 1, wherein a network component authenticates the transaction receipt.

14. The method of claim 13, wherein the network component receives the transaction receipt from the device.

15. The method of claim 1, wherein the subordinate licensable item comprises an additional feature of the base application that is subject to the subordinate license.

16. The method of claim 1, wherein the subordinate license includes one or more policies defining one or more conditions for enforcement of the subordinate licensable item.

17. At least one processor for licensing on a device, comprising:
    a first module configured to execute a base application on the device;
    a second module configured to initiate, by the base application, a transaction with an application store to obtain access to a subordinate licensable item that is usable by the base application;
    a third module configured to receive a transaction receipt corresponding to the transaction for the subordinate licensable item;
    a fourth module configured to obtain, from a license server, a subordinate license that corresponds to the subordinate licensable item in response to sending a license request including the transaction receipt for the subordinate licensable item to the license server; and
    a fifth module configured to receive, by the base application, the subordinate license from a license agent service on the device in response to the base application sending a license status query to the license agent service.

18. A computer program product for licensing on a device, comprising:
    a non-transitory computer-readable storage medium for storing instructions comprising:
       at least one instruction for causing a computer to execute a base application on the device;
       at least one instruction for causing the computer to initiate, by the base application, a transaction with an application store to obtain access to a subordinate licensable item that is usable by the base application;
       at least one instruction for causing the computer to receive a transaction receipt corresponding to the transaction for the subordinate licensable item;
       at least one instruction for causing the computer to obtain, from a license server, a subordinate license that corresponds to the subordinate licensable item in response to sending a license request including the transaction receipt for the subordinate licensable item to the license server; and at least one instruction for causing the computer to receive, by the base application, the subordinate license from a license agent service on the device in response to the base application sending a license status query to the license agent service.

19. An apparatus for licensing on a device, comprising:
means for executing a base application on the device;
means for initiating, by the base application, a transaction with an application store to obtain access to a subordinate licensable item that is usable by the base application;
means for receiving a transaction receipt corresponding to the transaction for the subordinate licensable item;
means for obtaining, from a license server, a subordinate license that corresponds to the subordinate licensable item in response to sending a license request including the transaction receipt for the subordinate licensable item to the license server; and
means for receiving, by the base application, the subordinate license from a license agent service on the device in response to the base application sending a license status query to the license agent service.

20. An apparatus for licensing on a device, comprising:
a communication component;
a base application configured to execute on the device;
a memory for storing the base application on the device;
the base application further configured to initiate, via the communication component, a transaction with an application store to obtain access to a subordinate licensable item that is usable by the base application, the base application further configured to receive a transaction receipt corresponding to the transaction for the subordinate licensable item; and
a license agent service configured to obtain, from a license server via the communication component, a subordinate license that corresponds to the subordinate licensable item in response to sending a license request including the transaction receipt for the subordinate licensable item to the license server,
wherein the base application is further configured to receive the subordinate license from the license agent service in response to sending a license status query to the license agent service.

21. The apparatus of claim 20, wherein the license agent service is further configured to obtain the subordinate license by receiving the subordinate license at the license agent service on the device from the license server in response to a completion of the transaction with the application store.

22. The apparatus of claim 21, wherein the license agent service is further configured to receive the license status query from the base application and to forward the subordinate license corresponding to the base application to the base application.

23. The apparatus of claim 20, further comprising an in-application purchase service on the device configured to receive the transaction receipt from the base application, to determine identifying information corresponding to the base application, to forward the license request including the identifying information and the transaction receipt for the subordinate licensable item to the license server, and to receive the subordinate license in response to the license request.

24. The apparatus of claim 23, wherein the identifying information of the base application enables validation of the base application on the device by a network boundary server, and wherein the transaction receipt enables authentication of the transaction.

25. The apparatus of claim 20, further comprising a component configured to provision the device with the subordinate license by validating the subordinate licensable item received from the license server.

26. The apparatus of claim 20, wherein the license agent service is further configured to obtain the access to the subordinate license by receiving an unlocking code for the subordinate licensable item comprising a locked feature of the base application.

27. The apparatus of claim 20, wherein the subordinate licensable item comprises a consumable item having a value corresponding to use.

28. The apparatus of claim 20, wherein the license agent service is further configured to obtain the access to the subordinate licensable item by obtaining an expansion item that is executable with the base application to provide the base application with additional functionality.

29. The apparatus of claim 20, wherein the license agent service is further configured to provision the device with the subordinate license by validating the subordinate licensable item received from the license server.

30. The apparatus of claim 20, wherein the subordinate licensable item comprises a bundle of subordinate licensable items including at least one or more that provide additional functionality or a consumable item usable by the base application.

31. The apparatus of claim 20, wherein the license agent service is further configured to synchronize, via the communication component, the base application and the subordinate license with the license server.

32. The apparatus of claim 20, wherein the license agent service is further configured to:
send an identifier for a device or a subscription to the license server; and
receive a base application license and the subordinate license transferred from another device being replaced or that corresponds to the subscription.

33. A method of licensing on a device, comprising:
storing a base license for a base application on the device;
receiving, at the device, a subordinate license for a subordinate licensable item usable by the base application in response to sending a license request including a transaction receipt for the subordinate licensable item to a license server;
receiving a request to execute the base application;
enforcing, by a license agent service on the device, the base license with respect to executing the base application; and
enforcing, by the base application, the subordinate license during execution of the base application.

34. The method of claim 33, further comprising enforcing the base license for the base application on the device by synchronizing the base license with a server.

35. The method of claim 33, further comprising tracking, by the license agent service on the device, the subordinate licensable item comprising a consumable item.

36. The method of claim 33, wherein the subordinate licensable item comprises a bundle of subordinate licensable items.

37. The method of claim 33, further comprising:
identifying a second device that is associated with a subscription for the base license and the subordinate license on the device comprising a first device; and transferring the base license and the subordinate license to the second device.

38. The method of claim 33, further comprising:
receiving a query from the base application, and
responding, by the license agent service, with license details of the subordinate license.

39. The method of claim 33, further comprising:
receiving, by the license agent service on the device, an enforcement query from the base application; and
responding, by the license agent service and in response to the enforcement query, with license details of the subordinate license.

40. The method of claim 33, further comprising revoking, by the license agent service on the device, the subordinate license in response to detecting revocation of the base license.

41. The method of claim 33, wherein the subordinate licensable item comprises an additional feature of the base application that is subject to the subordinate license.

42. The method of claim 33, wherein the subordinate license includes one or more policies defining one or more conditions for enforcement of the subordinate licensable item.

43. At least one processor for licensing on a device, comprising:
a first module configured to store a base license for a base application on the device;
a second module configured to receive, at the device, a subordinate license for a subordinate licensable item usable by the base application in response to sending a license request including a transaction receipt for the subordinate licensable item to a license server;
a third module configured to receive a request to execute the base application;
a fourth module configured to enforce, by a license agent service on the device, the base license with respect to executing the base application; and
a fifth module configured to enforce, by the base application, the subordinate license during execution of the base application.

44. A computer program product for licensing on a device, comprising:
a non-transitory computer-readable storage medium for storing instructions comprising:
at least one instruction for causing a computer to store a base license for a base application on the device;
at least one instruction for causing the computer to receive, at the device, a subordinate license for a subordinate licensable item usable by the base application in response to sending a license request including a transaction receipt for the subordinate licensable item to a license server;
at least one instruction for causing the computer to receive a request to execute the base application;
at least one instruction for causing the computer to enforce, by a license agent service on the device, the base license with respect to executing the base application; and
at least one instruction for causing the computer to enforce, by the base application, the subordinate license during execution of the base application.

45. An apparatus for licensing on a device, comprising:
means for storing a base license for a base application on the device;
means for receiving, at the device, a subordinate license for a subordinate licensable item usable by the base application in response to sending a license request including a transaction receipt for the subordinate licensable item to a license server;
means for receiving a request to execute the base application;
means for enforcing, by a license agent service on the device, the base license with respect to executing the base application; and
means for enforcing, by the base application, the subordinate license during execution of the base application.

46. An apparatus for licensing on a device, comprising:
a memory configured to store a base license for a base application on the device;
an in-application purchase service component configured to receive, at the device, a subordinate license for a subordinate licensable item usable by the base application in response to sending a license request including a transaction receipt for the subordinate licensable item to a license server;
a license agent service component on the device configured to receive a request to execute the base application and to enforce the base license with respect to executing the base application; and
the base application configured to enforce the subordinate license during execution.

47. The apparatus of claim 46, wherein the license agent service is further configured to enforce the base license for the base application on the device by synchronizing the base license with a server.

48. The apparatus of claim 46, wherein the license agent service is further configured to track the subordinate licensable item comprising a consumable item.

49. The apparatus of claim 46, wherein the subordinate licensable item comprises a bundle of subordinate licensable items.

50. The apparatus of claim 46, wherein the license agent service is further configured to identify a second device that is associated with a subscription for the base license and the subordinate license on the device comprising a first device, and to transfer the base license and the subordinate license to the second device.

51. The apparatus of claim 46, wherein the license agent service is further configured to receive a query from the base application, and to respond with license details of the subordinate license.

52. The apparatus of claim 46, wherein the license agent service is further configured to receive an enforcement query from the base application, and to respond to the enforcement query with license details of the subordinate license.

53. The apparatus of claim 46, wherein the license agent service is further configured to revoke the subordinate license in response to detecting revocation of the base license.

* * * * *